(12) United States Patent
Verbovszky et al.

(10) Patent No.: US 6,467,840 B1
(45) Date of Patent: Oct. 22, 2002

(54) CHILD'S CAR SEAT INSERT

(76) Inventors: Esther A. L. Verbovszky, 325 N. Falmouth Dr., Rocky River, OH (US) 44116; Carl J. Myers, 7816 Little Mountain Rd., Mentor, OH (US) 44060

( * ) Notice: Subject to any disclaimer, the term of this patent is extended or adjusted under 35 U.S.C. 154(b) by 0 days.

(21) Appl. No.: 09/886,772

(22) Filed: Jun. 21, 2001

Related U.S. Application Data (63) Continuation-in-part of application No. 09/515,164, filed on Feb. 29, 2000, now Pat. No. 6,341,818.

(51) Int. Cl.[7] ............................................. A47C 31/00
(52) U.S. Cl. ................................................ 297/219.12
(58) Field of Search ...................... 297/250.1, 219.1, 297/219.12, 467, 397, 394

(56) References Cited

U.S. PATENT DOCUMENTS

| | | |
|---|---|---|
| 3,596,986 A | 8/1971 | Ragsdale |
| 4,383,713 A | 5/1983 | Roston |
| 4,653,809 A | 3/1987 | Czernakowski et al. |
| 4,775,183 A | 10/1988 | Tsuge et al. |
| 4,793,651 A | 12/1988 | Inagaki et al. |
| 5,056,533 A | 10/1991 | Solano |
| 5,127,120 A | 7/1992 | Mason |
| 5,265,931 A | 11/1993 | Ryan |
| 5,310,245 A | 5/1994 | Lyszczasz |
| 5,482,352 A | 1/1996 | Leal et al. |
| 5,551,749 A | 9/1996 | Reher et al. |
| 5,833,309 A | 11/1998 | Schmitz |
| 5,842,739 A | 12/1998 | Noble |
| 5,916,089 A | 6/1999 | Ive |
| 5,918,933 A * | 7/1999 | Hutchinson |
| 5,988,744 A | 11/1999 | Franchak |
| 6,036,263 A | 3/2000 | Gold |
| 6,142,565 A | 11/2000 | Rieder |

* cited by examiner

Primary Examiner—Milton Nelson, Jr.
(74) Attorney, Agent, or Firm—Tarolli, Sundheim, Covell, Tummino & Szabo L.L.P.

(57) ABSTRACT

A child's car seat insert is for preventing slouching of a child adapted to be placed on the insert in a car seat in a travel position. The insert includes a bed portion having a top surface for receiving the child and for engaging at least the back of the child. The insert also includes a support for supporting the child on the top surface and for minimizing slouching of the child in the car seat. The insert also includes a pocket located in the bed portion for releasably receiving the support.

23 Claims, 11 Drawing Sheets

CHILD'S CAR SEAT INSERT

CROSS REFERENCE TO RELATED APPLICATION

This application is a continuation-in-part of U.S. application Ser. No. 09/515,164 (now U.S. Pat. No. 6,341,818), which was filed on Feb. 29, 2000.

TECHNICAL FIELD

The present invention relates, generally, to children's car seats and, more particularly, to inserts for children's car seats to provide improved support for the child, especially for infants and newborns.

BACKGROUND OF THE INVENTION

All states require that children be restrained in an appropriate car seat while in an operating vehicle. While the states differ on the exact maximum child size and age requirement, they all have laws that are designed to protect children until they are old or big enough so that only seat belts provide appropriate safety. This is especially important for newborns just being discharged from the hospital after birth. Child car seat manufacturers have developed standard types and sizes of car seats to assure parents that not only are their children safe but that they are compliant with the laws of the States. Unfortunately, these standardized child car seats cannot accommodate newborns or very small infants, including premature newborns and prematurely discharged newborns weighing 2 kg. or less.

This creates a problem for the parents in transporting the child. This problem affects not only the comfort of the child but also his or her safety and health. Studies have shown that premature infants have significant decreases in oxygen saturation while restrained in a car seat with 30% experiencing hypoxia, bradycardia, sleep apnea or some combination of those conditions. The decrease in oxygen saturation is directly related to the degree to which the infant is reclining in the car seat; the more upright the infant, the greater the physiological risk, the more supine, the lesser the risk. This occurs because the more upright the infant, the greater the tendency for the infant to slouch or slump, either forward or sideways, thereby resulting in airway obstruction in the infant. Infant slouching or slumping occurs for two basic reasons, low birth weight infants cannot resist the gravitational effects if their bodies are in a too upright position, and standard sized child car seats do not provide the necessary support and orientation for these infants to prevent the gravitational effects. These effects can cause secondary slumping since most infants do not have the physical maturation of the back to maintain an upright position.

To counteract this effect, parents and other caregivers have resorted to rolling up towels, blankets, etc. and wedging them into the space between the infant and the child car seat. Although this method may provide a remedy for the problem, it does not secure the child in the event of an accident or other sudden operation of the automobile.

U.S. Pat. No. 5,735,576 to Pepys, et al discloses a head support device for a child's car seat. The Pepys, et al device is a flexible, folding support that does not provide the necessary full body cushioning and support for children of any size. Basic Comfort, Inc. provides a similar type of head support insertable in a car seat. This device also provides a head and body support but without the necessary cushioning to prevent slouching or slumping.

Accordingly, there exists a need for a child's car seat insert that provides a cushioning positioner and secures the child in the car seat when the child is too small for the car seat. The cushioning positioner should secure the child in a physiologically and physically beneficial orientation and protect the child from injury.

SUMMARY OF THE INVENTION

The present invention provides a child's car seat insert that satisfies the aforementioned need.

Accordingly, it is an object of the present invention to provide a cushioning positioner that inserts into any standard child's car seat.

It is another object of the present invention to provide a cushioning positioner that will secure any size child, but especially newborns and infants, including those weighing less than 2 kg, in physiologically and a physically beneficial position while in a car seat.

It is yet another object of the present invention to provide a cushioning positioner that has a cradle angle such that the child is positioned at a proper incline to prevent slumping and slouching while in the car seat.

It is yet another object of the present invention to provide a cushioning positioner that is manufactured from cushioning media to provide comfort, support and security to the child while in the car seat.

It is yet another object of the present invention to provide a cushioning positioner that is comprised of inflatable chambers.

Accordingly, the present invention relates to an insert for a child's car seat comprising a cushioning positioner secured into a child's car seat such that the cushioning positioner secures a child of any size in the car seat in a physiologically and physically beneficial orientation and protects the child from injury.

In another aspect, the present invention relates to an insert for a child's car seat comprising a base with child placement area therein; and a restraint having a pivot and a securing end that is pivotally attached to the base such that when the restraint is pivoted away from the base, a child can be placed into the child placement area and when the restraint is pivoted toward the base it releasably attaches at the securing end to the base.

In yet another aspect, the present invention relates to an insert for a child's car seat comprising a base having a bed and forming a cushioning positioner such that the cushioning positioner secures a child of any size in the car seat in a physiologically and physically beneficial orientation and protects the child from injury due to the operation of the car.

In still another aspect of the invention, an insert is for location in a child's car seat for preventing slouching of a child adapted to be placed in the car seat. The car seat includes a seat portion and a backrest provided with a pair of shoulder straps that are operative to extend over the child to releasably engage a safety buckle. The insert includes first and second continuous surface portions which define a solid wedge-shaped singular body. The first surface portion is for engaging the child when placed into the car seat. The first surface portion extends angularly between the seat portion and the region of a midpoint of the backrest of the child's car seat. The first surface portion forms an obtuse cradle angle and an acute angle with the seat portion of the child's car seat. The cradle angle is located outside of the body. The acute angle is located at least in part inside the body. The body is for transferring weight of the child to the child's car seat.

In still another aspect of the invention, a child's car seat insert is for preventing slouching of a child adapted to be placed on the insert in a car seat in a travel position. The insert includes a bed portion having a top surface for receiving the child and for engaging at least the back of the child. The insert also includes a support for supporting the child on the top surface and for minimizing slouching of the child in the car seat. The insert also includes a pocket located in the bed portion for releasably receiving the support.

In still another aspect of the invention, an apparatus includes a child seat to be placed on a vehicle seat. The child seat has a backrest and a seat portion. The apparatus also includes an insert for location in the child seat for minimizing sloughing of a child placed on the insert when the insert is located in the child seat. The insert, when placed on the child seat, extends between the seat portion and the region of a midpoint of the backrest. The insert comprises first and second continuous surface portions which define a solid wedge-shaped singular body. The first surface portion is for facing the child in the child seat. The second surface portion is for facing the backrest and the seat portion of the child seat. The body is for transmitting the weight of the child to the child seat. The first surface portion forms an obtuse angle of between 105° and 135° with the seat portion when the body is transmitting the weight of the child to the car seat.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 21 is an enlarged schematic view of FIG. 19a;

FIG. 22 is a schematic view of a portion of a car sea insert similar to FIG. 17; and, FIG. 23 is a schematic view of a portion of the car seat insert placed into a car seat.

DESCRIPTION OF THE INVENTION

The present invention is a child's car seat insert comprising a cushioning positioner 10. The cushioning positioner 10 is received within a child's car seat and can secure a child of any size, including infants and newborns, in the car seat in a physiologically and physically beneficial orientation, whether reclined or semi-upright, and protects the child from injury and especially injury that may result from the operation of the car. The cushioning positioner 10 secures infants and newborns weighing less than about 2 kg. and who do not appropriately fit into standard sized car seats.

Figure 1:
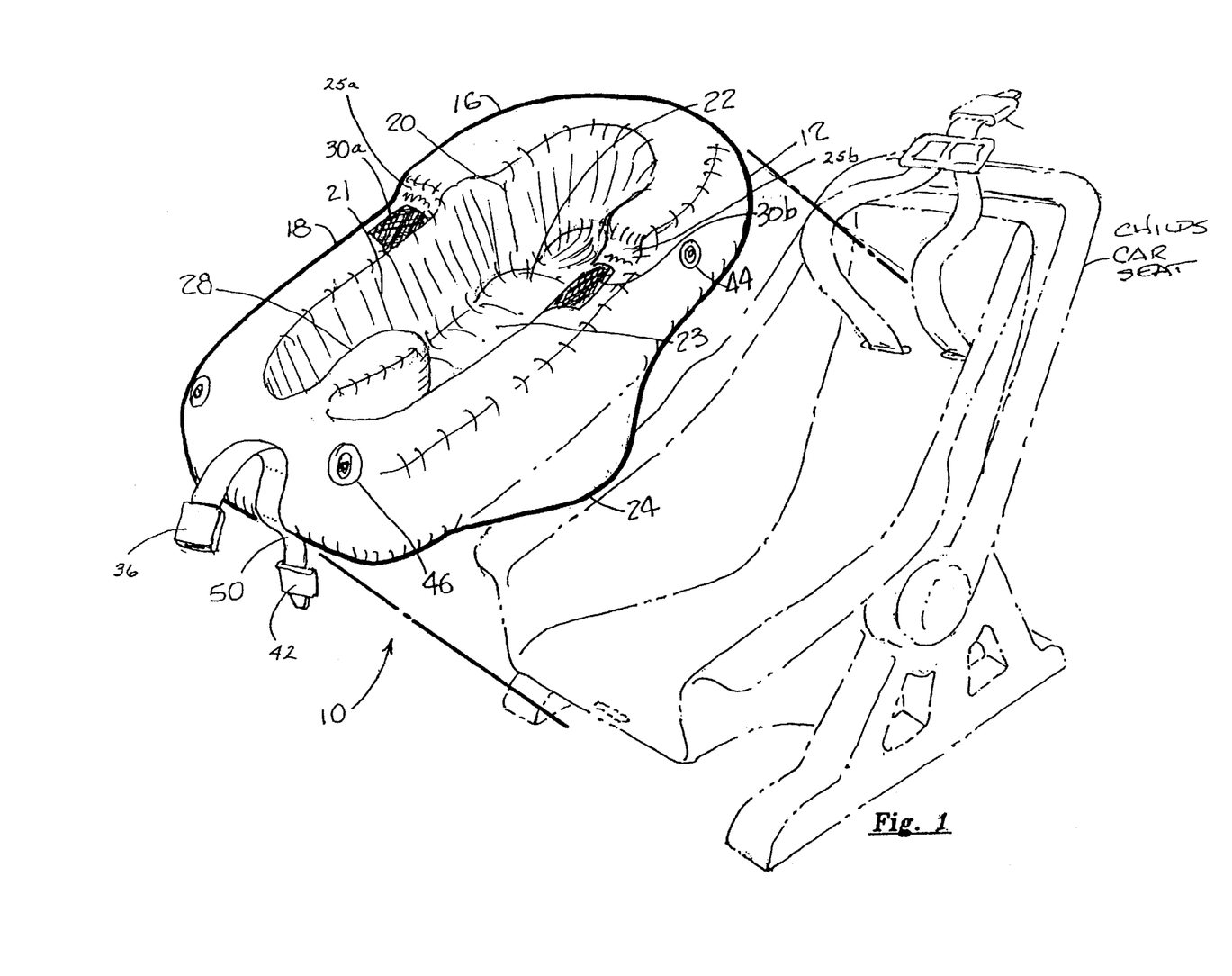
FIG. 1 is a perspective view of the present invention shown inserted in a child's car seat.

Referring now to the drawings and, more particularly, to FIG. 1, there is shown a perspective view of the present invention. The cushioning positioner 10 has a base 12 with bed 22. Head wall 20 and trunk wall 21 extend around the perimeter of bed 22 at the head section 16 and trunk section 18, respectively, thereby defining a child placement area 23. Head wall 20 extends more than does trunk wall 21 thereby forming steps 25a and 25b on opposite points of the perimeter of bed 22. Securing member attachments 30a and 30b and belt clips (not shown) are located on trunk wall 21 at the steps 25a and 25b. Pommel 28 extends from the trunk section 18 of the base 12. When the cushioning positioner 10 is inserted in a child's car seat and a child placed therein, the car seat straps are routed through the belt clips (not shown) and pass over the pommel 28 and latch into the car seat buckle thereby securing the child. In the event the car seat straps are not long enough to reach the car seat buckle, harness 50, terminated at one end with a harness buckle 36 and on the other with a harness latch plate 42 and having a harness adjuster (not shown), can be used. Harness 50 is attached to the base 12. Harness buckle 36 is sized to accept the latch plate of standard car seat shoulder straps; and harness latch plate 42 is sized to fit and lock into a standard car seat buckle. The harness adjuster (not shown) is used to adjust the overall length of the harness 50.

Figure 2:
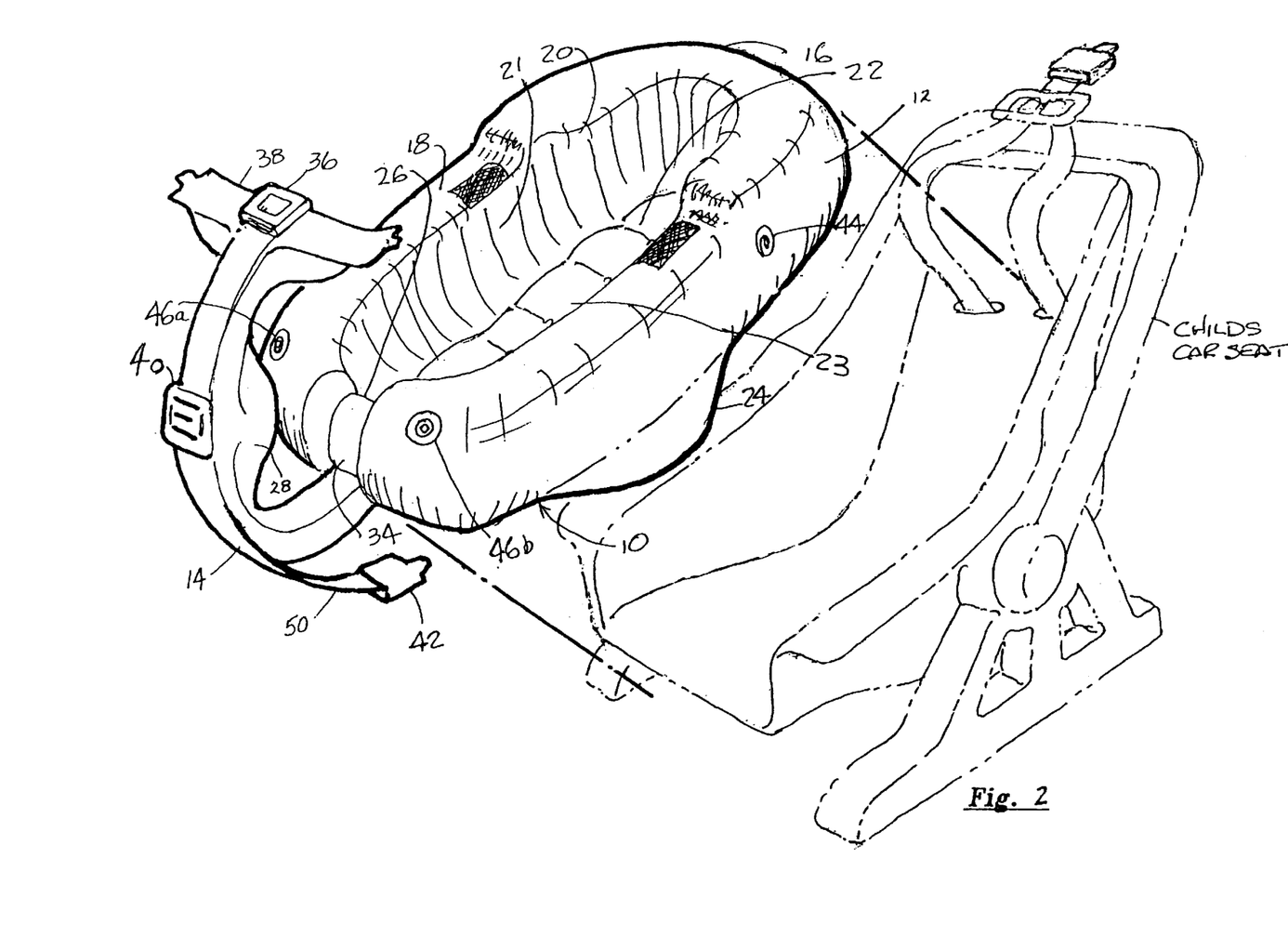
FIG. 2 is another perspective view of the present invention shown inserted in a child's car seat.

Referring now to FIG. 2, there is shown another perspective view of the present invention. In FIG. 2, the cushioning positioner 10 of FIG. 1 is provided with a restraint 14. Pommel 28 is attached to the restraint 14 instead of being attached to the trunk section 18 of base 12, as in FIG. 1. Trunk section 18, however, now has a restraint notch 26 formed therein to receive and locate the restraint 14. Securing member 38 extends from the securing end of the restraint 14 and at right angles thereto forming a tee bar configuration therewith. Restraint 14 is pivotally attached to the base 12 at trunk section 18 by pivot 34. Pivot 34 can be any material that provides a pivoting movement, and may be a flexible member or strap releasably attached to the restraint 14 and base 12 such that restraint 14 can be completely separated from base 12. Harness 50, terminated at one end with a harness buckle 36 and on the other with a harness latch plate 42 and having a harness adjuster 40, is attached to the restraint 14. Harness adjuster 40 is attached between the harness buckle 36 and harness latch plate 42. Harness buckle 36 is sized to accept the latch plate of standard car seat shoulder straps, and harness latch plate 42 is sized to fit and lock into a standard car seat buckle. Harness adjuster 40 is used to adjust the overall length of the harness 50. Pivot 34 allows the restraint 14 to move toward or away from the bed 22.

Back support 24 attaches to and extends from the base 12. With the restraint 14 pivoted away from the base 12, a child can be placed into the cushioning positioner 10. The restraint 14 is then pivoted toward the bed 22 until the securing member 38 comes in contact with the trunk wall 21 at the securing patches 30a and 30b. The car seat straps are routed through the belt clips (not shown) and the car seat latch plate is inserted into the harness buckle 36. Harness latch plate 42 is inserted into the car seat buckle at the bottom of the car seat. Harness adjuster 40 is then manipulated to assure that the harness 50 and the car seat belts are tight to provide a secure fit of the cushioning positioner 10 in the car seat. When the restraint 14 is pivoted toward the bed 22, it locates and is detained in restraint notch 26.

Figure 3:
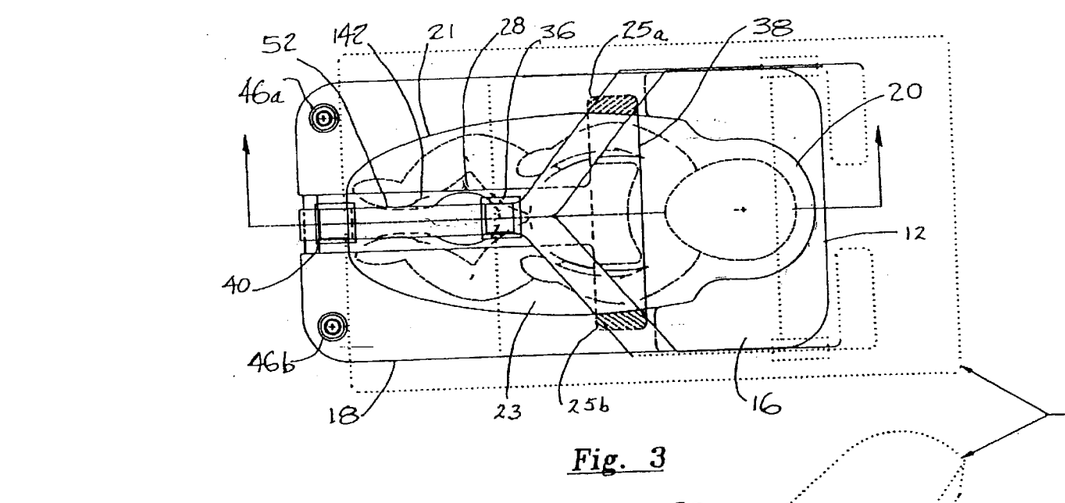
FIG. 3 is top a plan view of the present invention inserted in a child's car seat.

Referring now to FIG. 3, there is shown a top plan view of the cushioning positioner 10 in a car seat with a child placed therein. The head wall 20 provides cushioning support for the child's head and assures that it is kept in proper lateral alignment. The trunk wall 21 provides cushioning support for the child's body, arms and legs and assures that the arms and legs are laterally restrained and that the body is kept in proper lateral alignment. Pommel 28, whether attached to the trunk section 18, as shown in FIG. 1, or to the restraint 14, as shown in FIG. 2, is located between the child's legs thereby providing support for the child's body and assisting in keeping the body in proper position preventing slumping while in the cushioning positioner 10. The restraint 14 assures that the child is restrained in the child placement area 23 preventing slumping and slouching.

Figure 4:
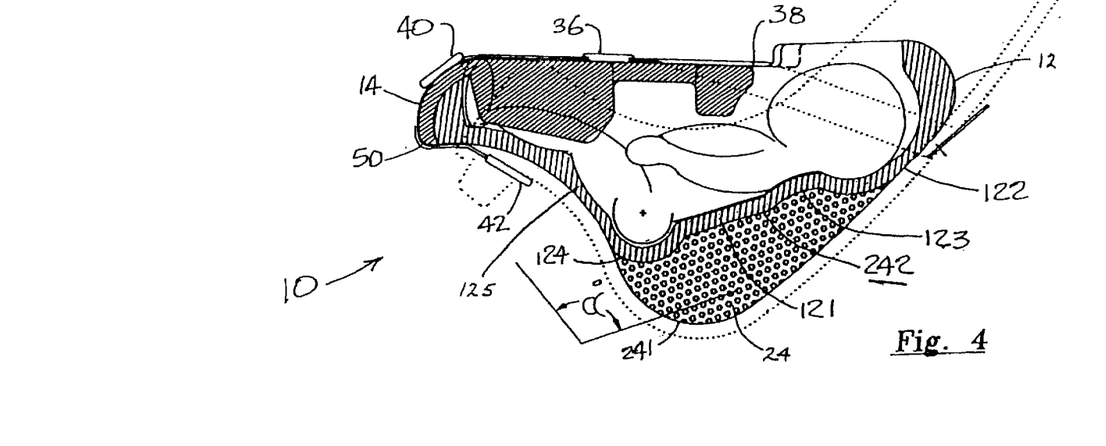
FIG. 4 is a cross-sectional view of the present invention taken along section-indicating lines 4—4 in FIG. 3.

Referring now to FIG. 4, there is shown a cross-sectional view taken along section-indicating lines 4—4 in FIG. 3. Back support 24 is received within the base of the car seat and is positioned adjacent the crease area where the back and the base of the car seat meet. At this point the back and the base of the car seat form a certain base angle $\alpha$. The back support 24 is made of flexible resilient material so that it fits securely into the car seat assuming the base angle $\alpha$ on its lower plane 241. The top surface 242 of the back support 24 is releasably attached to the base bottom 121. When inserted in the car seat, the base bottom 121 forms a cradle angle $\beta$ independent of base angle $\alpha$. Cradle angle $\beta$ is larger than base angle $\alpha$ such that the cushioning positioner 10 places the child's body in a less inclined (i.e., more supine) orientation. This is especially important for infants and newborns since their musculature is not developed sufficiently to withstand the force of gravity which would cause slouching and slumping if subjected to base angle $\alpha$. The base bottom 121 is contoured to have a head support 122, neck support 123, buttocks support 124 and legs support 125 to assure contact with those areas and to provide a positive support thereat. The cradle angle $\beta$ along with back support 24, head support 122, neck support 123 and buttocks support 124 provides a physiologically and physically beneficial position for newborns or other small infants, especially those weighing less than about 2 kg. and who do not appropriately fit into standard sized child's car seats.

The cushioning positioner 10 is manufactured of cushioning media, such as cotton, foam rubber, foam vinyl, air, water, etc., or any combination thereof, covered with a suitable skin manufactured of plastic, nylon or any suitable material. For example, the cushioning positioner can have a skin manufactured with a nylon facing and a backing of 65/35% combination of polyester/cotton. Also, the skin can be manufactured to be washable either, in-place or after removal from the cushioning media. The cushioning positioner 10 can be comprised of discrete chambers, especially in the event the cushioning media includes a fluid, like air or water, either solely or in combination with other types of cushioning media. For example, the head section 16, trunk section 18 and back support 24 can be made of discrete chambers with separations therebetween (not shown). In that case, inflation valves for each discrete chamber are included in the design. Referring again to FIGS. 1 and 2, there is shown three inflation valves, head valve 44 which allows for inflation of the head section 16 and first and second trunk valves 46a and 46b which allow inflation of the trunk section 18. The inflation valves can be Halkey-Roberts 420-ACC Presto-Seal valves or any suitable valve dependent upon the inflating media, as one of ordinary skill in the art understands and appreciates. The inflation valves inflate their respective chambers to a level as necessary to provide appropriate security and positioning for the child based upon the size of the child and the type of car seat. The cushioning positioner 10 can be inflated by mouth or by using a regular hand pump or other type of pump. The inflation is gauged such that the child placement area 23 comfortably accepts the child while providing a snug fit around the child preventing any lateral shifting, slumping or slouching. The base bottom 121 is made of slightly more rigid, but still flexible and resilient, material to provide support for the cushioning media of the rest of the base 12 and to allow for the contouring necessary to form the head support 122, neck support 123 buttocks support 124, and legs support 125.

Figure 5:
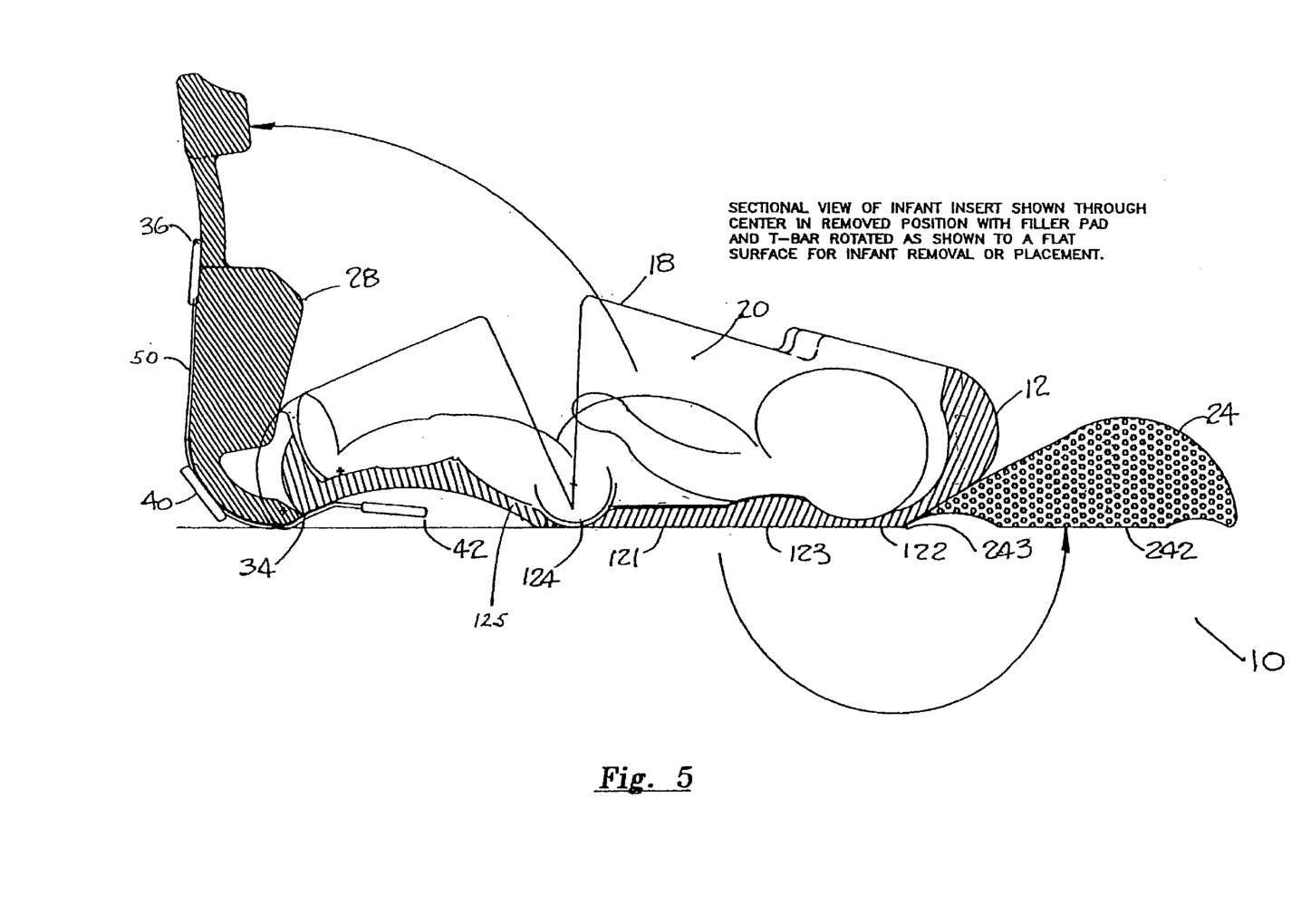
FIG. 5 is a cross-sectional view of the present invention taken along its longitudinal axis and shown outside the child's car seat and on a flat horizontal surface.

Referring now to FIG. 5, there is shown a cross-sectional view of the cushioning positioner 10 taken along its longitudinal axis and where the cushioning positioner 10 has been removed from the car seat and is located on a flat horizontal surface. The back support 24 is removably attached to the base 12 by Velcro-type fasteners or other suitable means, permitting the back support 24 to be swung away from the base 12 thereby disconnecting its top surface 242 from the base bottom 121. The back support 24 can remain connected to the base 12 at pivot point 243 or can be completely disconnected therefrom. The child can be placed in the cushioning positioner 10 and the head support 122, neck support 123, buttocks support 124 and legs support 125 will provide the appropriate support for those areas of the body. As the child grows, it may be preferable to completely remove the back support 24.

Figure 6:
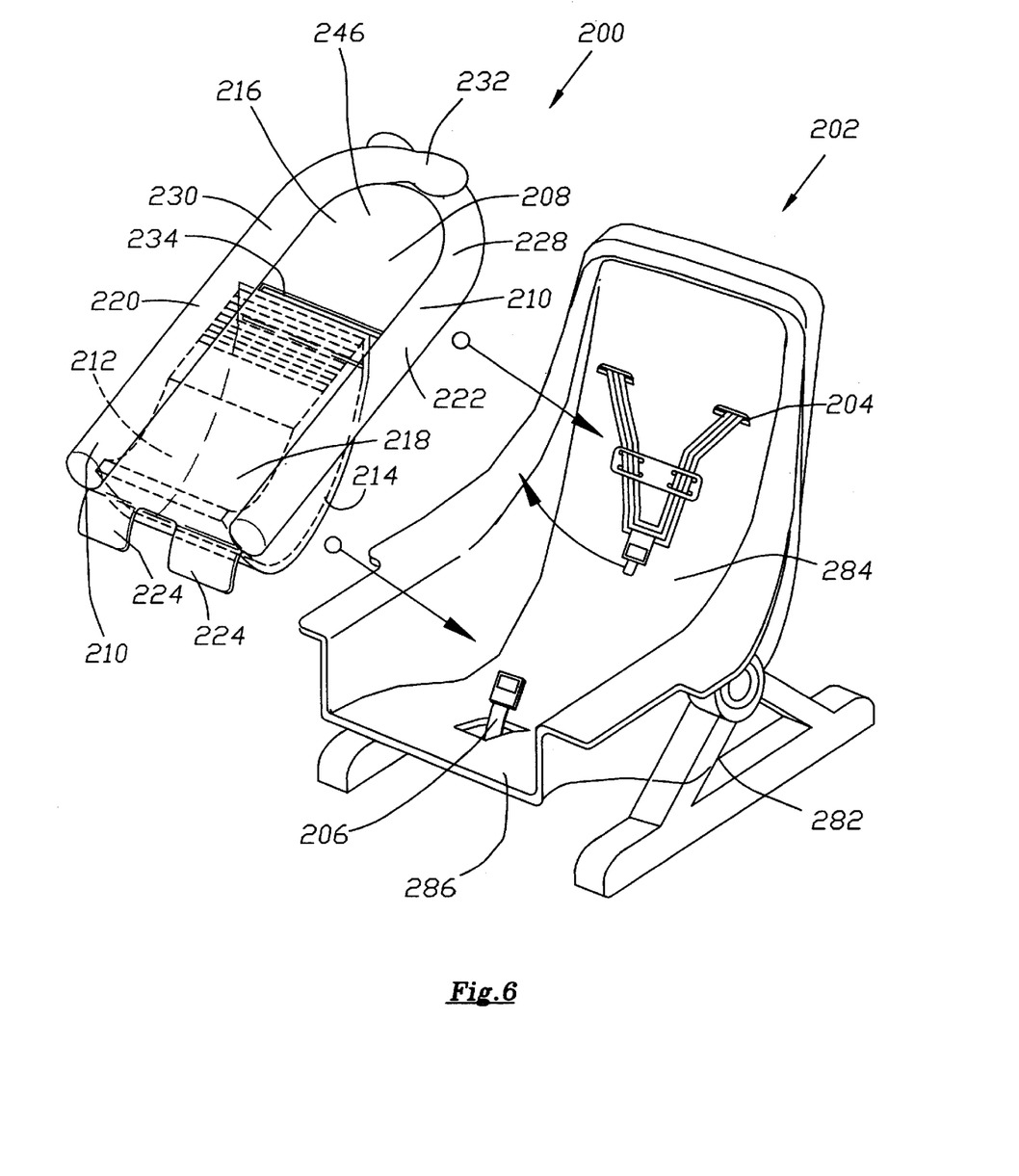
FIG. 6 is a schematic illustration of a further embodiment of a child's car seat insert constructed in accordance with the present invention and of a child's car seat to receive the insert.
Figures 7, 8:
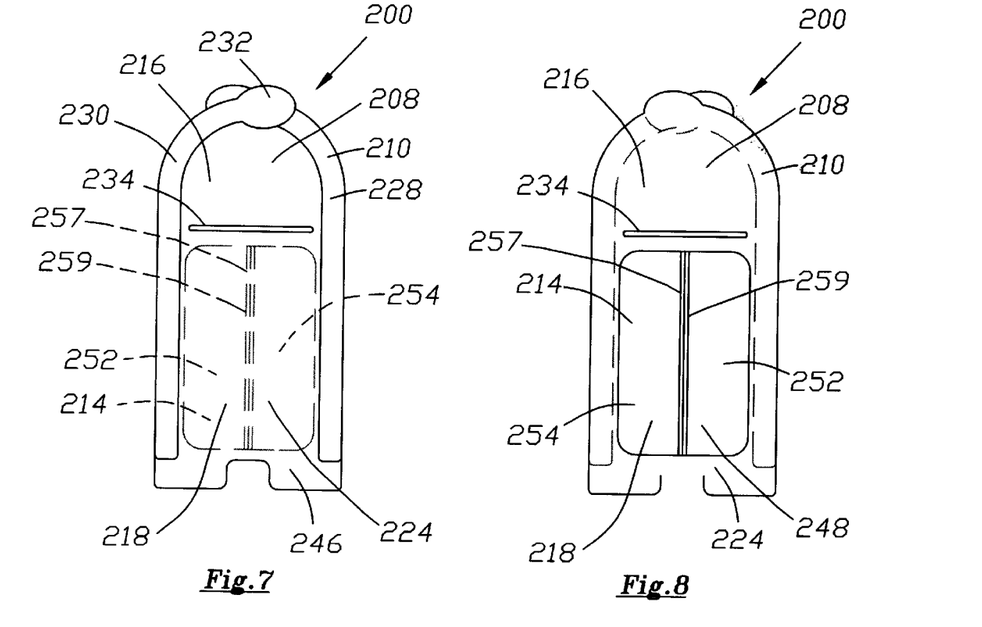
FIG. 7 is a schematic plan view of the car seat insert of FIG. 6.
FIG. 8 is a schematic back view of the car seat insert of FIG. 6.
Figures 9, 10:
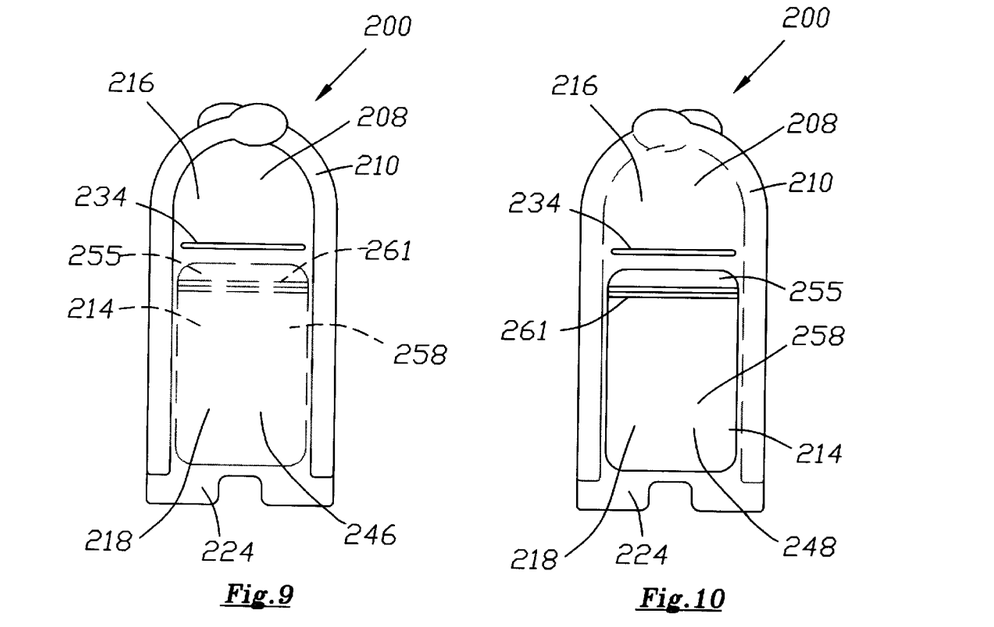
FIG. 9 is a schematic view similar to FIG. 7 of a further embodiment of a car seat insert.
FIG. 10 is a schematic view similar to FIG. 8 of the further embodiment of the car seat insert of FIG. 9.
Figure 11:
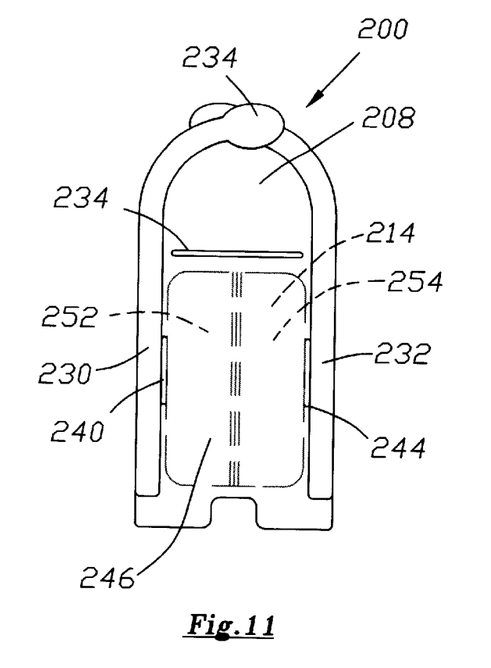
FIG. 11 is a schematic view similar to FIG. 7 of a still further embodiment of a car seat insert.
Figure 12:
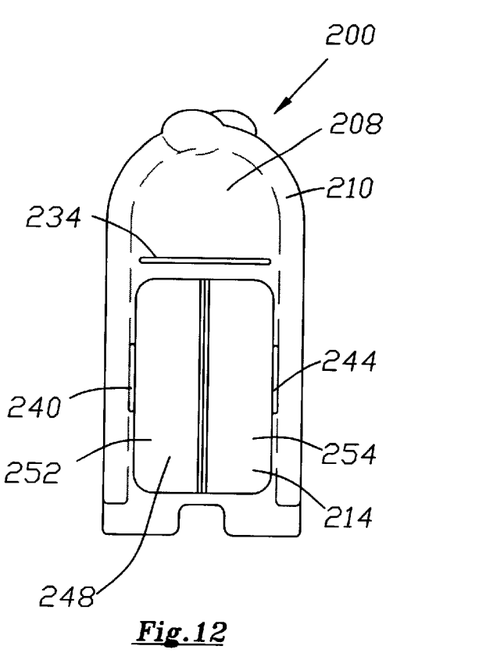
FIG. 12 is a schematic view similar to FIG. 8 of the further embodiment of the car seat insert of FIG. 11.
Figure 13:
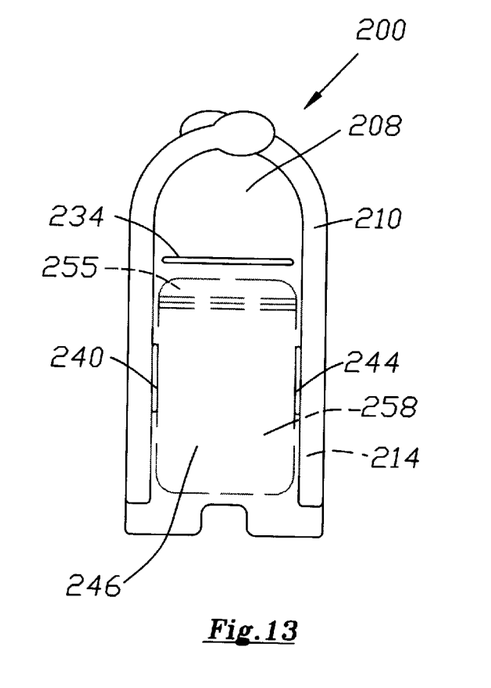
FIG. 13 is a schematic view similar to FIG. 9 of another embodiment of a car seat insert.
Figure 14:
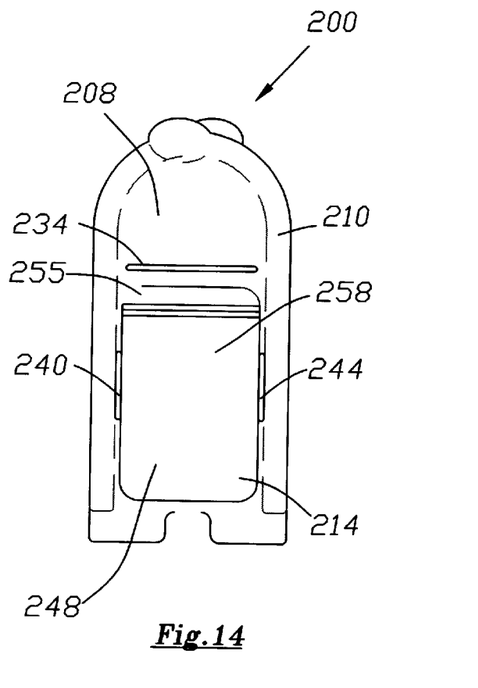
FIG. 14 is a schematic view similar to FIG. 10 of the embodiment of the car seat insert of FIG. 13.

FIG. 6 illustrates a child's car seat insert 200 constructed in accordance with a further embodiment of the invention. The car seat insert 200 is beneficial for preventing slouching of a child while traveling in a car seat. Children of all weights can use the car seat insert 200 but it is especially useful with children of low birth weight and who do not appropriately fit into standard sized car seats.

The car seat insert 200 is for use with a car seat 202 having a three point harness system. The car seat 202 has a backrest 284 and a seat portion 286. The car seat 202 includes two over-the shoulder seat belts 204 as well as a crotch seat belt 206. When a child is in the seat, the shoulder belts 204 are located over the child's shoulder and are attached to the crotch belt 206 which extends between the legs of the child. The crotch strap includes a belt buckle which receives a tongue connected to the shoulder belts to secure the belts together.

The car seat insert 200 includes a bed portion 208 against which a child lays. The car seat insert 200 includes a sidewall portion 210 extending partially around the perimeter of the bed portion 208. The car seat insert 200 includes a back and buttocks support 212 for supporting the back and buttocks of the child. The bed portion 208 includes a pocket 214 for containing the support 212.

Figure 16:
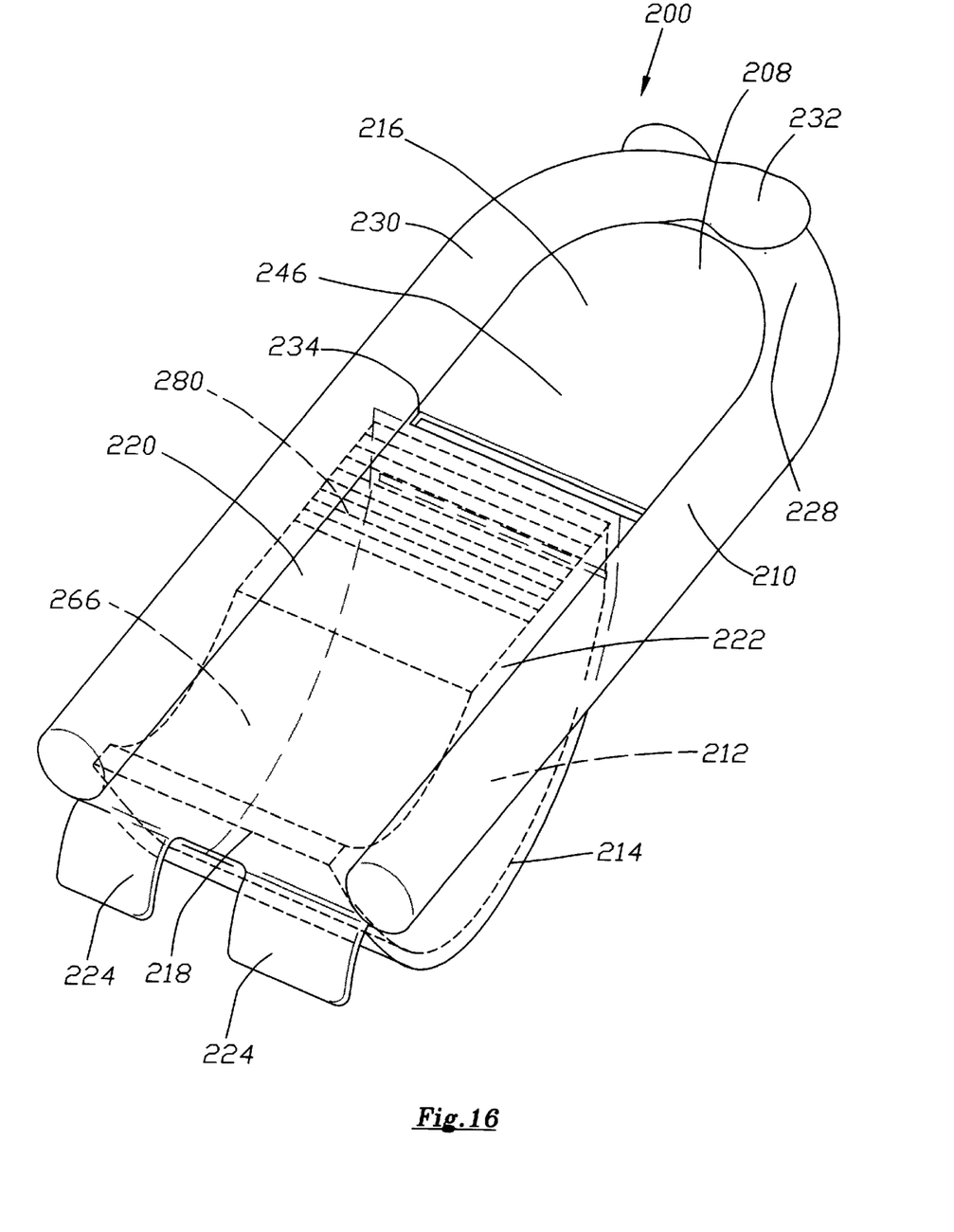
FIG. 16 is an enlarged schematic perspective view of the car seat insert of FIG. 6.

The bed portion 208 is made of a textile material such as wool, fleece, cotton, polyester or a blend thereof. The bed portion 208 is substantially rectangular in shape. The bed portion 208 has a rounded end 216, and an end 218 located opposite the rounded end as well as two elongated opposing side portions 220, 222. The end 218 has two optional flaps 224 (FIGS. 6 and 16). The child's head is located in the region of the rounded end 216 of the bed portion 208. The child's torso is located along the remainder of the bed portion. The child's legs and feet extend beyond the car seat insert 200. The legs engage the flaps 224 if the flaps 224 are part of the insert 200.

The car seat insert includes a sidewall 210 extending partially around the perimeter of the bed portion 208. The sidewall 210 extends around the rounded end 216 of the bed portion 208 and also extends along the two elongated sides 220, 222 of the bed portion. The sidewall 210 does not extend around the end 218 of the bed portion 208.

Alternatively, the car seat insert may be constructed in an oval shape with two rounded ends between two elongated sides. One rounded end could support the legs and feet of the child (not shown). Also, the sidewall 210 may be constructed to extend completely around the car seat insert whether oval shaped or shaped otherwise.

The sidewall 210 is a tube-shaped cushion which is attached to the perimeter of the bed portion 208 by for example, sewing, gluing or Velcro. The sidewall 210 is preferably made of a tube of French terry cloth material, and the tube is filled with batting. The batting is preferably a flame retardant 100% polyester material. French terry cloth consists of 80% cotton/20% polyester fiber. Instead of French terry cloth, the material of the tube of the sidewall 210 may be any suitable equivalent textile material such as cotton, polyester, wool, fleece, or a combination thereof. Also, the batting may be of a suitable material other than polyester materials.

The sidewall 210 may be a single tube (not shown) or may be two tube pieces 228, 230 (shown in FIG. 6). The two pieces 228, 230 may be different lengths. The two pieces 228, 230 may be either completely or partially sewn around the head and torso regions of the perimeter of the bed portion 208. For example, a first piece of sidewall 228 may be completely sewn to the bed portion 208 and the second piece 230 may be only partially sewn to the bed portion. The free end 232 of the second piece 230 then may be attached either to the bed portion 208, or to the first piece 228 by for example, glue or Velcro or safety pins. In addition, the tube piece may have a seam extending across the tube transversely to the length of the tube piece at a location which is between the head and torso regions of the bed portion. The seam would be located adjacent the shoulders of the child when placed onto the bed portion.

Referring to FIGS. 7–10 and 15, the bed portion 208 of the car seat insert 200 includes a single elongated slit 234 located at approximately in the middle of the bed portion and extends cross-wise to the length of the bed portion and perpendicular to a top to bottom center line of the insert 200. The slit 234 is located between the two elongated sides 220, 222 of the bed portion 208. The slit 234 is for passing through the two over-the-shoulder seat belt straps 204 of the three-point harness system of the child's car seat 202. The fabric around the slit 234 is reinforced, preferably by stitching, to prevent tearing or ripping.

The bed portion 208 has a top surface 246 and a bottom surface 248 (FIGS. 7–14). The child lies on the top surface 246 of the bed portion 208. The bed portion 208 includes the pocket 214, which receives the support 212. The pocket 214 is accessible from the bottom surface 248.

FIGS. 7–8 and 11–12 illustrate the car seat insert 200 including a pocket 214 having two half portions of preferably textile material 252, 254 which are approximately equal lengths. The two half portions 252, 254 are attached to the bottom surface 248. The two half portions 252, 254 are releasably attached together at an opening 257 by attaching means 259. The attaching means 259 may be Velcro, tabs, buttons, a zipper, or the like. The two half portions 252, 254 extend from the two elongated sides 220, 222 of the perimeter of the bed portion 208 to approximately the top to bottom center line of the bed portion. The portions 252, 254 are releasably attached together adjacent the top to bottom center line of the bed portion 208.

The pocket 214 extends from below the cross-wise slit 234 to the end portion 218 of the bed portion 208. The dimensions of the pocket 214 are large enough to enclose the back and buttocks support 212 which supports the back and buttocks of the child. The pocket 214 is releasably closed by the half portions 252, 254 when the half portions are attached together. The support 212 may be inserted or removed from the pocket 214 of the car seat insert 200 through the opening when the half portions 252, 254 are released from each other.

The pocket 214 may have alternative constructions. The pocket 214 may comprise two pieces of material 256, 258 of non-equal lengths (FIGS. 9–10 and 13–14). The two pieces 255, 258 may be releasably attached together at an opening 261. The opening is at the region of the cross-wise slit 234 and extends in the same direction as the cross-wise slit.

Referring to FIGS. 17–20, the back and buttocks support 212 is a singular piece of flexible resilient material. The support 212 is preferably made of a cushioning media such as a flame retardant foam rubber or foam vinyl, covered with a suitable washable skin made of hypoallergenic plastic, nylon, polyurethane or any suitable material. The support 212 may have a skin manufactured with nylon facing and a backing of a 65/35% combination of polyester and cotton.

The support 212 is a solid and uniform wedge shaped piece with a continuous surface. In the embodiment shown in FIGS. 17–17*a,* the support includes a curved surface portion 262 and an opposite surface portion 264 located opposite the curved surface portion. The support also includes a first lateral planar surface 263*a* and an opposing second lateral planar surface 263. The surfaces 263*a,* 263 are parallel to each other and are completely between surface portions 262, 264. The surface portion 264 is a flat planar surface. The surface portion 264 faces the child. The curved surface portion 262 has a part 262*a* which is substantially a quarter-circle and an adjacent part 262*b* which is straight and forms an acute angle $\theta$ from the surface portion 264. The acute angle θ between the surface portion 264 and the straight portion 262b of the curved surface portion 262 of the support 212 is within the range of 15–45° and is preferably 30°. The support 212 is for transferring weight of the child to the car seat.

Figures 17, 17A, 18, 18A, 19, 19A:
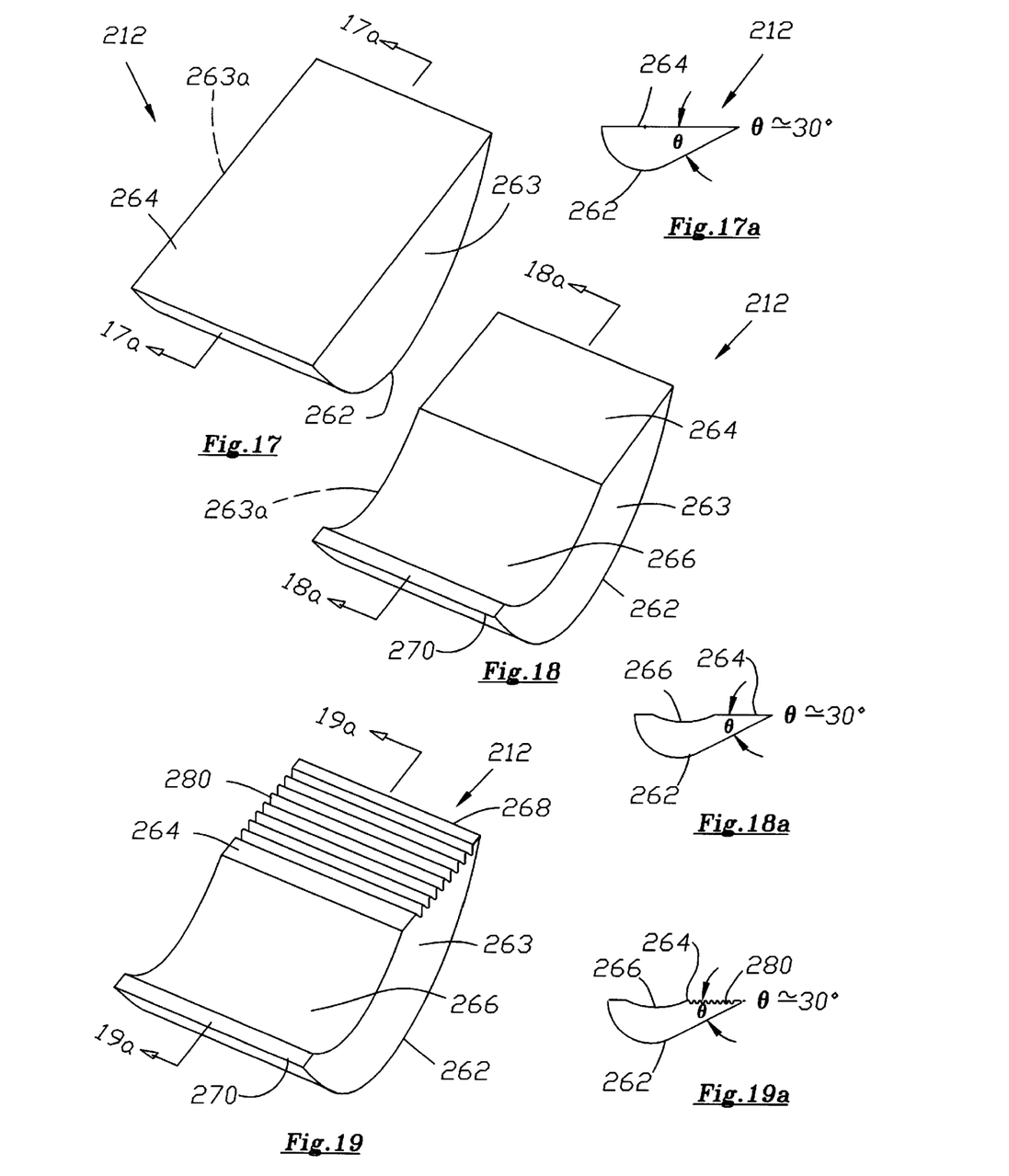
FIG. 17 is a schematic perspective view of a portion of a car seat insert.
FIG. 17a is a schematic view taken along the lines 17a—17a of FIG. 17.
FIG. 18 is a schematic perspective view of a further portion of a car seat insert.
FIG. 18a is a schematic view taken along the lines 18a—18a of FIG. 18.
FIG. 19 is a schematic perspective view of a portion of the car seat insert of FIG. 6.
FIG. 19a is a schematic view taken along the lines 19a—19a of FIG. 19.
Figure 20:
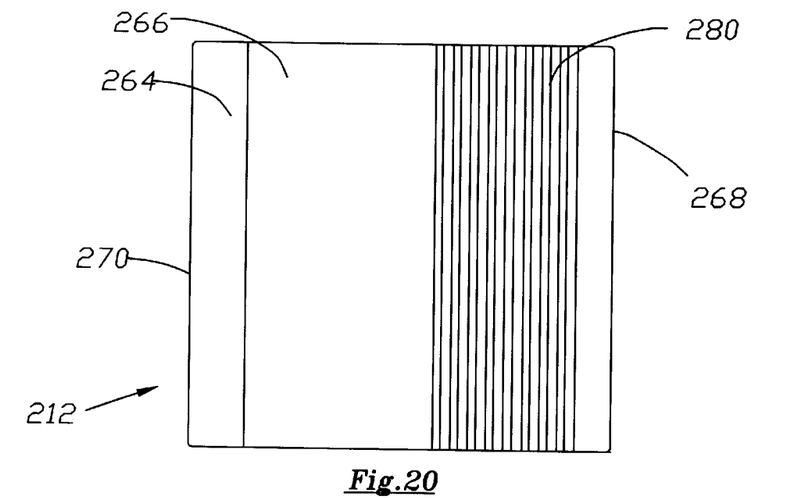
FIG. 20 is a schematic plan view of the portion of the car seat insert of FIG. 19.
Figure 21:
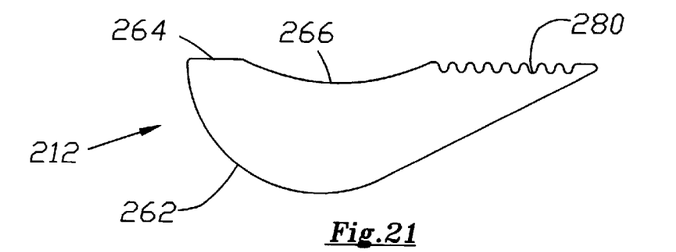

The embodiment shown in FIGS. 18–18a is identical to the embodiment of FIGS. 17, 17a except in the embodiment of FIGS. 18, 18a the surface portion 264 includes a curved depression or recessed surface 266 for engaging and supporting the buttocks of the child. The recessed surface 266 extends entirely across the surface portion 264. The recessed surface 266 extends from approximately 4 inches from the edge 268 of the surface portion 264 of the support 212 to approximately 1.5 inches from the opposite edge 270 of the support. The recessed surface 266 is a continuously curved, uninterrupted surface. The recessed surface 266 is concave to the planar surface portion 264. The support 212, in the region of the recessed surface 266 is a minimum of 2 inches thick and a maximum of 3 inches thick.

The recessed surface 266 is approximately three inches in length measured along line 18a—18a. The maximum depth of the recessed surface may be from approximately one-half inch deep to approximately two inches deep. The length and depth of the recessed surface 266 is uniform across the surface portion 264 between the lateral planar surfaces. The recessed surface 266 preferably has the same washable skin as the remainder of the support 212 (mentioned above).

The recessed surface 266 generally conforms to a geometric shape of a child's buttocks. That is, the surface begins to gradually recess beginning at approximately 4 inches from the edge 268 on the surface portion 264 of the support 212. The area where the recess begins is the area which engages the lower spine and buttocks area of the child. The recess gradually increases in depth and then decreases in depth until approximately 1.5 inches from the edge 270 of the support 212 at which point the recess ends. The area where the recess ends is the area which engages the back of the upper thighs and buttocks area of the child.

In the embodiment shown in FIGS. 19, 19a, and 20–21, the support 212 includes a recessed surface 266 as illustrated in FIG. 18 and also includes a plurality of spaced apart parallel ribs 280 adjacent to the recessed surface 266. The child's torso would overlie the ribs 280. The ribs 280 are provided to help keep the child from sliding down in the car seat 202. Instead of ribs 280, egg-crate-like indentations can be provided.

Figures 22, 23:
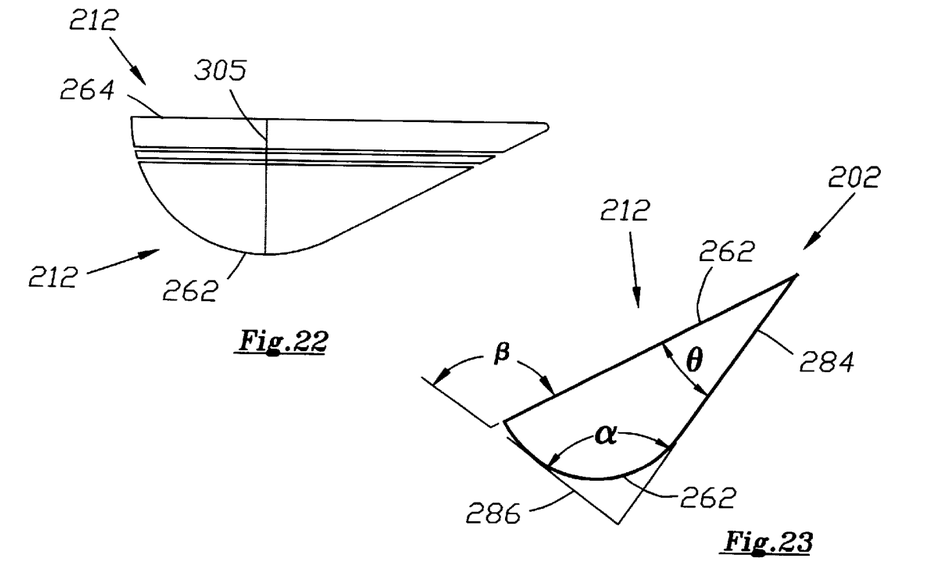

FIG. 22 illustrates another embodiment of the support 212. The support 212 is made of three layered pieces 300, 301 and 302. The pieces of the support 212 can be releasably attached to each other by Velcro to enable adjustment of the overall thickness of the support. In addition, the pieces 300, 301, 302 of the support 212 can simply be stacked on top of each other in a layered manner without being attached to each other. The support 212 formed by the three layered pieces has a maximum thickness of 3 inches as measured along line 305. A first piece 300 is 0.75 inches thick, which reduces the overall thickness of the support 212 to 2.25 inches, if the first piece is removed. A second piece 301 is 0.25 inch thick which reduces the overall thickness of the support to a minimum of 2 inches, if the second piece is removed when the first piece 300 is removed. If the second piece 301 is removed and piece 300 is not removed, the thickness is reduced to 2.75 inches. Instead of the second piece being 0.25 inches thick, the second piece can be 0.75 inches thick which would reduce the overall thickness of the support to a minimum of 1.5 inches if removed. It should be understood that the thickness of the three pieces 300, 301, 302 can vary as long as the overall thickness of the three pieces layered together remains a maximum of 3 inches as measured along line 305.

The embodiment of FIG. 22 is constructed similar to the embodiment of FIG. 17 except the thickness can be varied by removing pieces 300, 301 selectively. When the pieces 300, 301 are selectively removed the modified structure is identical to FIG. 17.

The car seat insert 200 illustrated in FIGS. 6, 7–10 and 15–16 is for use with the child's car seat having a three-point harness system 202. Alternatively, instead of a three-point harness system, the car seat insert can be used with a child's car seat having a five-point harness system (not shown). The five-point harness system is similar to the three-point harness system illustrated in FIG. 6 and includes two torso seat belts for extending around the waist of the child in addition to the two over-the-shoulder seat belts and crotch seat belt. In fact, the car seat insert 200 may be used with any car seat.

The car seat insert 200 illustrated in FIGS. 11–14 is for use in a child's seat having a five-point system. In the insert 200 of FIGS. 11–14, two additional slits 240, 244 are made along the sides of the bed portion, cross-wise to the slit 234 for the over-the-shoulder belts and extend from the cross-wise slit toward the feet region on the bed portion 208. The two side slits 240, 244 are similar in construction as the cross-wise slit 234 for the two over-the-shoulder seat belts. The two side slits are for passing through the two torso seat belts.

Figure 15:
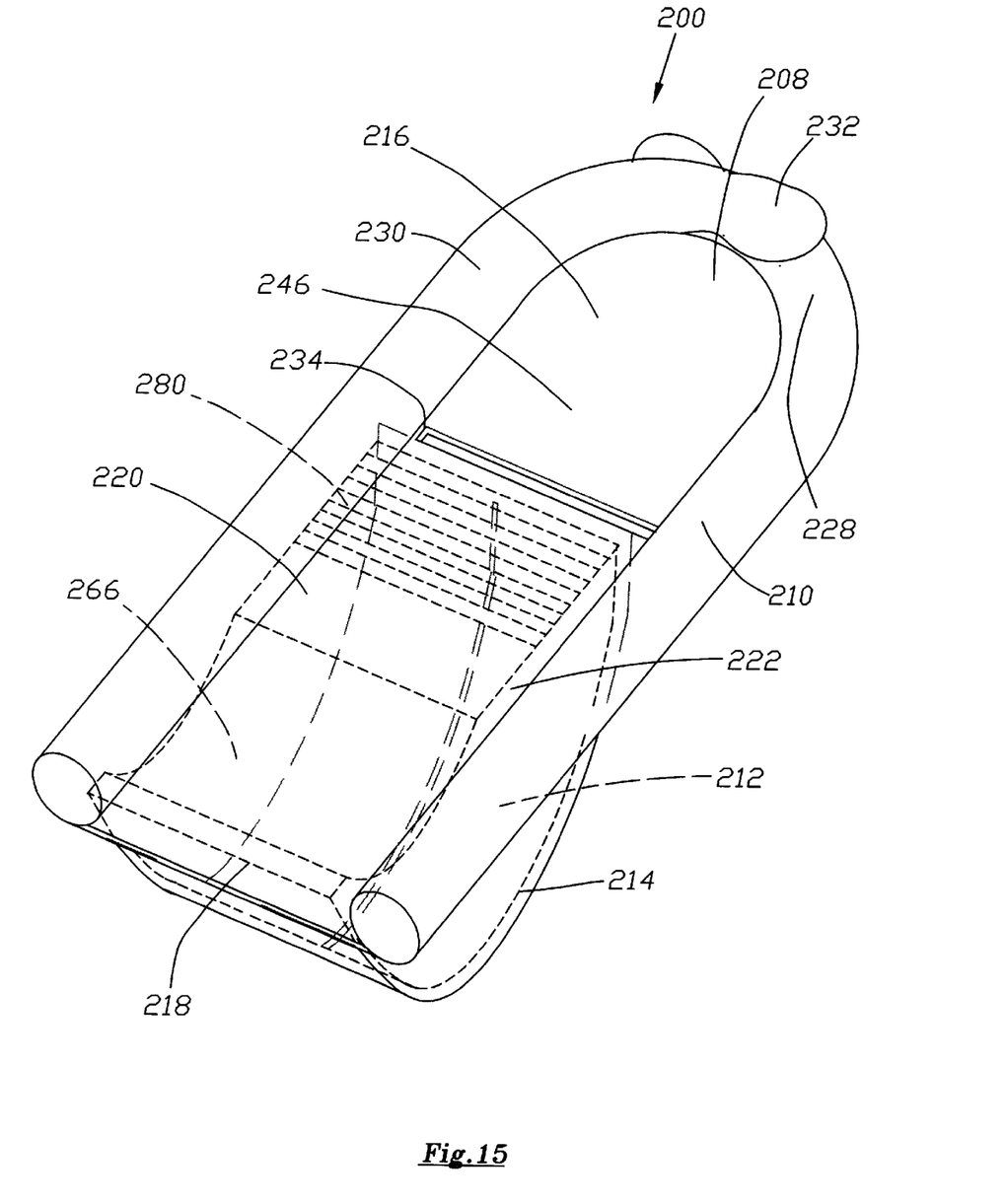
FIG. 15 is a schematic perspective view of still another embodiment of a car seat insert.

Upon assembly, the back and buttocks support 212 is inserted into the pocket 214 so that the curved surface portion 262 protrudes from the bottom surface 248 of the bed portion 208. (FIGS. 15–16) FIG. 15 illustrates the car seat insert 200 similar to FIG. 16 without the optional flaps 224. The dimensions of the support 212 match the dimensions of the pocket 214 and the support 212 fills the pocket. The opening for the pocket 214 is then closed. The assembled car seat insert 200 is placed into the car seat 202 so that the support 212 fills a portion of the car seat at the area 282 where the backrest 284 and the seat portion 286 of the car seat meet (FIG. 6).

As mentioned above, the support 212 has several embodiments. The acute angle θ between the surface portion 264 and the straight portion of the curved portion 262 of the support 212 is within the range of 15–45° and is preferably 30°. The surface portion 264 may be flat or include a recessed surface 266 and adjacent ribs 280.

FIG. 23 is a schematic representation showing the angles of the support 212 inside the insert placed into a car seat, as well as the car seat angles. Before placing the car seat insert 200 into the car seat 202, the car seat forms a base angle α at the area 282. The base angle α is the angle formed where the backrest 284 and the seat portion 286 of the car seat meet. The base angle α is approximately 90°.

Upon placing the car seat insert 200 into the car seat 202, the angle between the surface portion 264 of the support 212 inside the insert 200 and the seat portion 286 of the car seat forms an obtuse cradle angle β spaced apart from and independent of the base angle α. The cradle angle β is larger than base angle α. The angle θ of the support is still 90° because the straight portion 262b of the curved surface 262 of the support inside the insert is adjacent the backrest 284 of the car seat. (FIG. 23).

The cradle angle β is substantially equal to the sum of the angle θ i.e. 30° and the base angle α, i.e., 90°. As mentioned above, the angle θ is 15°–45°, and preferably, 30°. Thus, the cradle angle β is approximately 15°–45°, and preferably, 30° larger than the base angle α. Thus, the cradle angle β is approximately 105°–135°, and is preferably 120°.

From the above description of the invention, a car seat insert for location in a car seat is provided which supports the child in the car seat when the child is too small for the car seat and which, in combination with the safety belts on the car seat, secures the child in a physiologically and physically beneficial orientation that protects the child from injury.

From the above description of the invention, those skilled in the art will perceive improvements, changes and modifications. For example, although the back and buttocks support 212 has been described for insertion into the pocket 214 of the car seat insert 200 and used in conjunction with the insert, the back and buttocks support may be used separately without the insert in which case the surface 262 engages the backrest 284 of the car set and the surface 264 engages the child. Such improvements, changes and modifications within the skill of the art are intended to be covered by the appended claims.

Having described the invention, the following is claimed:

1. An insert for location in a child's car seat for preventing slouching of a child adapted to be placed in the car seat wherein the car seat includes a seat portion and a backrest provided with a pair of shoulder straps that are operative to extend over the child to releasably engage a safety buckle, said insert comprising:
   first and second continuous surface portions defining a solid wedge-shaped singular body;
   said first surface portion being for facing the child when placed in the child's car seat, said second surface portion being for facing the backrest and the seat portion of the child's car seat,
   said first surface portion adapted for extending angularly between the seat portion and the region of a midpoint of the backrest of the child's car seat;
   said first surface portion adapted for forming an obtuse cradle angle and an acute angle with the seat portion of the child's car seat;
   said cradle angle being located outside of said body, said acute angle being located at least in part inside said body,
   said body being for transferring weight of the child to the child's car seat.

2. The insert according to claim 1, wherein said body has a maximum thickness of three inches.

3. The insert according to claim 1, wherein said body has a recessed surface for supporting the buttocks of the child.

4. The insert according to claim 3, wherein said body has a plurality of ribs adjacent said recessed surface.

5. The insert according to claim 3, wherein the maximum depth of said recessed surface is within the range of one inch deep to 2 inches deep when measured from said first surface portion.

6. The insert according to claim 3, wherein said body in the region of said recessed surface is a minimum of 1 inch thick when said recessed surface is two inches thick and a maximum of 2 inches thick when said recessed surface is one inch thick.

7. The insert according to claim 1, wherein said cradle angle is within the range of 105°–135°.

8. The insert according to claim 1, wherein said acute angle is within the range of 15–45°.

9. The insert according to claim 1, further including first and second members associated with said body, said first and second members being slices of material similar to material of said body.

10. The insert according to claim 9, wherein said first and second members, when associated with said body, increase the thickness of said body to a maximum of three inches and increases the length of said body while still keeping the wedge-shaped form of said body.

11. The insert according to claim 10, wherein, when said second member is removed from said first member, said maximum thickness of said body is reduced to 2.25 inches, and wherein, when said first member is removed from said body after said second member is removed, said maximum thickness of said body is reduced to 1.5 inches.

12. The insert according to claim 9, wherein said first member is associated with said first surface portion of said body, and said second member is associated with said first member.

13. A child's car seat insert for preventing slouching of a child adapted to be placed on the insert in a car seat in a travel position, said car seat insert comprising:
   a bed portion having a top surface for receiving the child and for engaging at least the back of the child, said bed portion comprising a head region for supporting the head of the child and a body region for supporting the body of the child and being located longitudinally spaced apart from said head region;
   a back support for location in said body region and for supporting the back and buttocks of the child on said top surface and for minimizing slouching of the child in the car seat; and
   a pocket located in said body region for releasably receiving said back support.

14. The child's car seat insert according to claim 13, further including a side wall portion connected to and extending partially around a perimeter of said bed portion.

15. The child's car seat insert according to claim 14, wherein said bed portion includes a rounded end and an end located opposite said rounded end, said bed portion including two elongated opposing side portions located along the length of said bed portion.

16. The child's car seat insert according to claim 15, wherein said bed portion defines an elongated slit for passing through two over-the-shoulder seat belt straps of the car seat, said elongated slit extending between said two elongated opposing side portions of said bed portion and being located adjacent said pocket in the region of said rounded end.

17. The child's car seat insert according to claim 15, wherein said bed portion defines two side slits for receiving torso belts, said two side slits extending along the length of said bed portion and being located between said sidewall portion and said pocket on each of said elongated opposing side portions of said bed portion.

18. The child's car seat insert according to claim 16, wherein said pocket is made of two equal size portions of material releasably attached to each other, said pocket being located between said two elongated opposing side portions of said bed portion, said pocket extending from adjacent said elongated slit to said end of said bed portion located opposite said rounded end.

19. The child's car seat insert according to claim 16, wherein said pocket is made of two unequal sized portions of material releasably attached to each other at an opening, said pocket being located between said two elongated opposing side portions of said bed portion and adjacent said elongated slit, said opening extending in the same direction as the elongated slit.

20. The child's car seat insert according to claim 13, wherein the car seat has a backrest and a seat portion, the backrest of the car seat and the seat portion meet forming a base angle α of 90°, said support having a surface facing a child and forming a cradle angle β within the range of 105°–135° with the seat portion of the car seat when in the car seat.

21. A child's car seat insert for preventing slouching of a child adapted to be placed on the insert in a car seat in a travel position, said car seat insert comprising:

a bed portion having a top surface for receiving the child and for engaging at least the back of the child;

a support for supporting the child on said top surface and for minimizing slouching of the child in the car seat;

a pocket located in said bed portion for releasably receiving said support;

said support being wedge-shaped and having a curved portion and an opposite portion, said curved portion having a straight portion spaced apart from said opposite portion by an angle within the range of 15–45°.

22. A child's car seat insert for preventing slouching of a child adapted to be placed on the insert in a car seat in a travel position, said car seat insert comprising:

a bed portion having a top surface for receiving the child and for engaging at least the back of the child;

a support for supporting the child on said top surface and for minimizing slouching of the child in the car seat;

a pocket located in said bed portion for releasably receiving said support; and a side wall portion connected to and extending partially around a perimeter of said bed portion;

said sidewall being a tube-shaped cushion made of a textile material selected from the group consisting of wool, fleece, cotton, polyester, polyester/cotton blend and French terry cloth.

23. Apparatus comprising:

a child seat to be placed on a vehicle seat, said child seat having a backrest and a seat portion;

an insert for location in said child seat for minimizing slouching of a child placed on said child seat;

said insert, when located in said child seat, extending between said seat portion and the region of a midpoint of said backrest, said insert comprising:

first and second continuous surface portions defining a solid wedge-shaped singular body;

said first surface portion being for facing the child in said child seat, said second surface portion being for facing said backrest and said seat portion of the child seat;

said body being for transmitting the weight of the child to the child seat;

said first surface portion forming an obtuse angle of between 105° and 135° with said seat portion when said body is transmitting the weight of the child to the child seat.

* * * * *